(12) United States Patent
Panshin et al.

(10) Patent No.: US 9,779,340 B2
(45) Date of Patent: Oct. 3, 2017

(54) CREDITS TO USE A DEVICE AND ATTACKER RESISTANT COUNTER

(71) Applicant: HEWLETT-PACKARD DEVELOPMENT COMPANY, L.P., Houston, TX (US)

(72) Inventors: Stephen D. Panshin, Corvallis, OR (US); Rowdy K. Webb, Portland, OR (US); Jefferson P. Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/782,942

(22) PCT Filed: Apr. 30, 2013

(86) PCT No.: PCT/US2013/038713
§ 371 (c)(1),
(2) Date: Oct. 7, 2015

(87) PCT Pub. No.: WO2014/178824
PCT Pub. Date: Nov. 6, 2014

(65) Prior Publication Data
US 2016/0042259 A1 Feb. 11, 2016

(51) Int. Cl.
*G06K 15/00* (2006.01)
*G06F 21/10* (2013.01)
*G06F 3/12* (2006.01)

(52) U.S. Cl.
CPC ....... *G06K 15/4065* (2013.01); *G06F 3/1203* (2013.01); *G06F 3/1204* (2013.01); *G06F 3/1222* (2013.01); *G06F 3/1239* (2013.01); *G06F 3/1296* (2013.01); *G06F 21/10* (2013.01); *G06F 21/105* (2013.01); *G06K 15/408* (2013.01); *G06K 15/4095* (2013.01)

(58) Field of Classification Search
CPC . G06K 15/4056; G06F 3/1203; G06F 3/1239; G06F 3/1296; G06F 21/10
USPC .................. 358/1.14, 1.15; 399/79
See application file for complete search history.

(56) References Cited

U.S. PATENT DOCUMENTS

| 6,957,921 | B1 | 10/2005 | Silverbrook et al. |
| 8,306,878 | B2 | 11/2012 | Nagarajan |
| 8,332,332 | B2 | 12/2012 | Carlson et al. |
| 2003/0065713 | A1 | 4/2003 | Quach et al. |
| 2003/0074312 | A1 | 4/2003 | White |

(Continued)

FOREIGN PATENT DOCUMENTS

WO    WO-2010064085 A1    6/2010

OTHER PUBLICATIONS

International Search Report & Written Opinion received for PCT Application No. PCT/US2013/038713; dated Jan. 27, 2014, 10 pages.

(Continued)

*Primary Examiner* — Jamares Q Washington
(74) *Attorney, Agent, or Firm* — HP Inc. Patent Department

(57) ABSTRACT

Disclosed herein are a system, non-transitory readable medium, and method to manage license to use agreements. The maximum number of credits a device is allowed to consume is determined. An attacker resistant counter is increased using an atomic write.

12 Claims, 2 Drawing Sheets

(56) References Cited

U.S. PATENT DOCUMENTS

| | | |
|---|---|---|
| 2003/0182368 A1* | 9/2003 | Horiyama ............. G06F 3/1204 709/203 |
| 2009/0047997 A1 | 2/2009 | Silverbrook et al. |
| 2010/0195133 A1* | 8/2010 | Adkins .................. G06F 21/10 358/1.14 |
| 2010/0313056 A1* | 12/2010 | Margolis ................ G06F 1/263 713/500 |
| 2010/0315680 A1 | 12/2010 | Ishikake |
| 2011/0191197 A1* | 8/2011 | VanWinkle ........... G06Q 20/40 705/26.1 |
| 2011/0220711 A1* | 9/2011 | Hendley ................ G06Q 30/06 235/375 |

OTHER PUBLICATIONS

User Guide, ObjectPrint Software, Version 4.1, 2012, pp. 1-53, Fitosoft, Available at: <fitosoft.com/download/ObjectPrint.pdf>.

* cited by examiner

CREDITS TO USE A DEVICE AND ATTACKER RESISTANT COUNTER

BACKGROUND

Some vendors heretofore may license the use of software products, hardware products, or digital content. Such a license may specify, for example, the number of times the product may be used or the device in which digital content or software may be downloaded. A recent development in licensing is credit based licensing. In such a system, a hardware or digital product may be associated with a number of credits that may be consumed by a user each time the product is utilized.

DETAILED DESCRIPTION

As noted above, a product may be associated with a number of credits that may be consumed by a user. The credits available may be in accordance with a license to use agreement. Such credits may be stored in a device and may be traced as they are consumed. The credits may be associated with digital content such as music, movies, text, etc. Alternatively, the credits may be associated with ink usage of a printing device or with the number of pages the device is allowed to print. Unfortunately, these credits may be vulnerable to attackers who seek to violate the license by maliciously altering the credits consumed or the maximum number of credits allowed. This allows the attacker to use the device, software, or digital content beyond that which Is allowed by the license. In turn, vendors may experience a loss of revenue or a decrease in the issuance of licenses, since attackers may reset the number of credits consumed or increase the maximum number of credits allowed and continue to use the product without restriction.

In view of the foregoing, disclosed herein are a system, computer-readable medium, and method for managing license to use agreements. In one example, the maximum number of credits a device is allowed to consume is determined. In a further example, an attacker resistant counter is increased using an atomic write. In one example, an atomic write may be defined as a two stage transaction in which a first transaction deletes an old value and a second transaction writes a new value. In a further example, an atomic write may be undone if the write is interrupted or aborted midway through the atomic write. As will be discussed in more detail below, reversing an interrupted write may prevent an attacker from ceasing the increase when the old value is deleted and modifying the counter to defraud the system. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
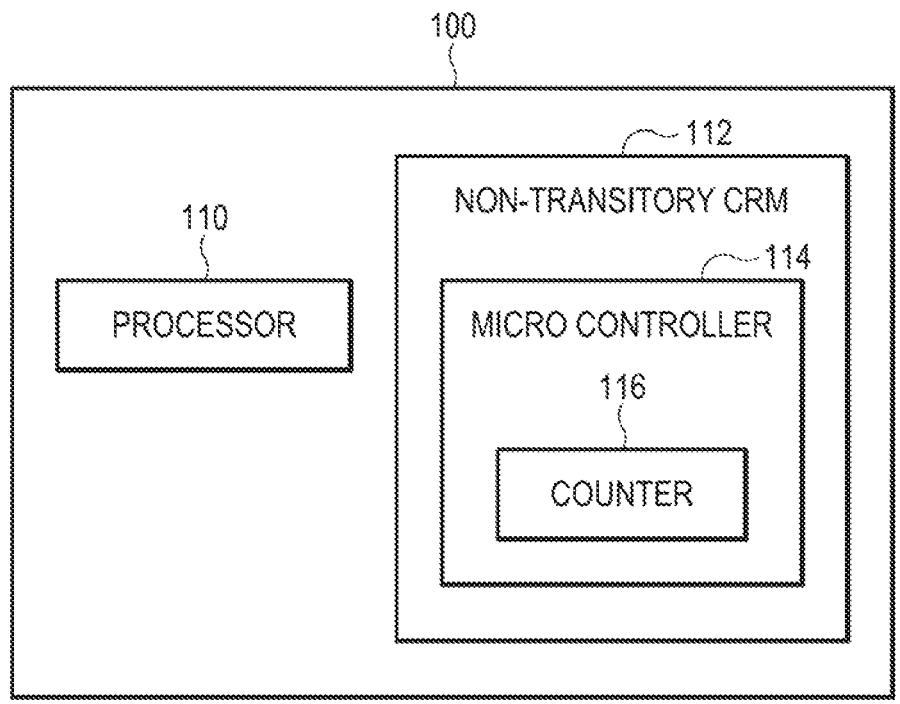
FIG. 1 is a block diagram of an example system in accordance with aspects of the present disclosure.

FIG. 1 presents a schematic diagram of an illustrative device 100 for executing the techniques disclosed herein. In one example, device 100 may be a desktop or laptop PC with a keyboard and mouse and/or various other types of input devices such as pen-inputs, joysticks, buttons, touch screens, etc., as well as a display, which could include, for instance, a CRT, LCD, plasma screen monitor, TV, projector, etc. In another example, device 100 may be a smart phone or tablet; in yet a further example, device 100 may be a printing device. The device 100 may also comprise a processor 110, which may be any number of well known processors, such as processors from Intel® Corporation. In another example, processor 110 may be an application specific integrated circuit ("ASIC").

Non-transitory computer readable medium ("CRM") 112 may store instructions that may be retrieved and executed by processor 110. As will be discussed in more detail below, the instructions may comprise a microcontroller 114. Non-transitory CRM 112 may be used by or in connection with any instruction execution system that can fetch or obtain the logic from non-transitory CRM 112 and execute the instructions contained therein. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to device 100 directly or indirectly. Alternatively, non-transitory CRM 112 may be an electrically erasable programmable read-only memory ("EEPROM") or a smart card with integrated circuits to implement microcontroller 114 in accordance with aspects of the present disclosure. The non-transitory CRM 112 may also include any combination of one or more of the foregoing and/or other devices as well. While only one processor and one non-transitory CRM are shown in FIG. 1, device 100 may actually comprise additional processors and memories that may or may not be stored within the same physical housing or location.

In one example, processor 110 may determine whether the maximum number of credits available for a given device Is greater than or equal to a sum of a number of credits consumed by the given device and a number of credits requested by the device. As will be discussed below, the maximum number of credits available may be received via a secure packet from a remote usage manager. If the maximum number of credits available is greater than or equal to the sum, processor 110 may initiate an increase of counter 116 using microcontroller 114. Counter 116 may indicate the number of credits consumed by the device. Upon receipt of the packet from a remote usage manager, processor 110 may respond to the packet so as to acknowledge receipt and storage of the maximum number of credits. The maximum number of credits may be stored in a non-volatile memory to ensure that it's stored and accessible despite a power outage or a shutdown of the system.

Microcontroller 114 may be implemented in the form of hardware, software, or a combination of hardware and software. In one example, processor 110 may use microcontroller 114 to increase counter 116 when a credit is consumed such that the increase is equal to a number of credits requested, in one example, counter 116 is a read-write max counter resistant to decrease by an attacker. Such resistance to an attacker may be carried out by logic in the operating system of microcontroller 114. As noted above, the increase may be executed as an atomic write. An example of such an atomic write will be discussed below with regard to FIG. 4.

Figure 2:
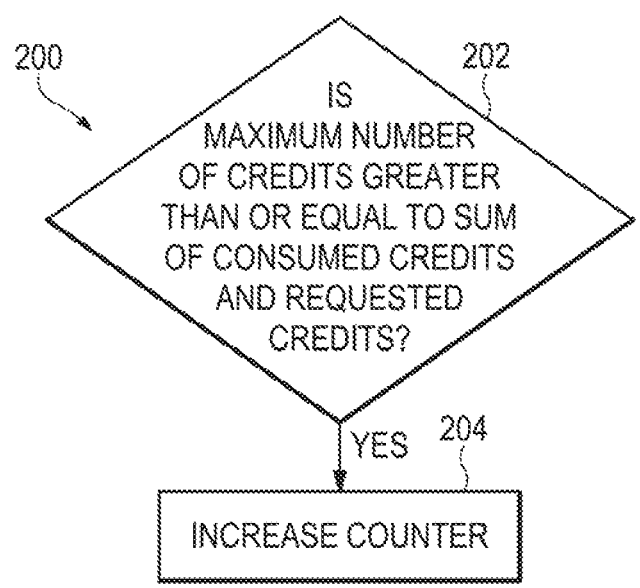
FIG. 2 is a flow diagram of an example method in accordance with aspects of the present disclosure.
Figure 3:
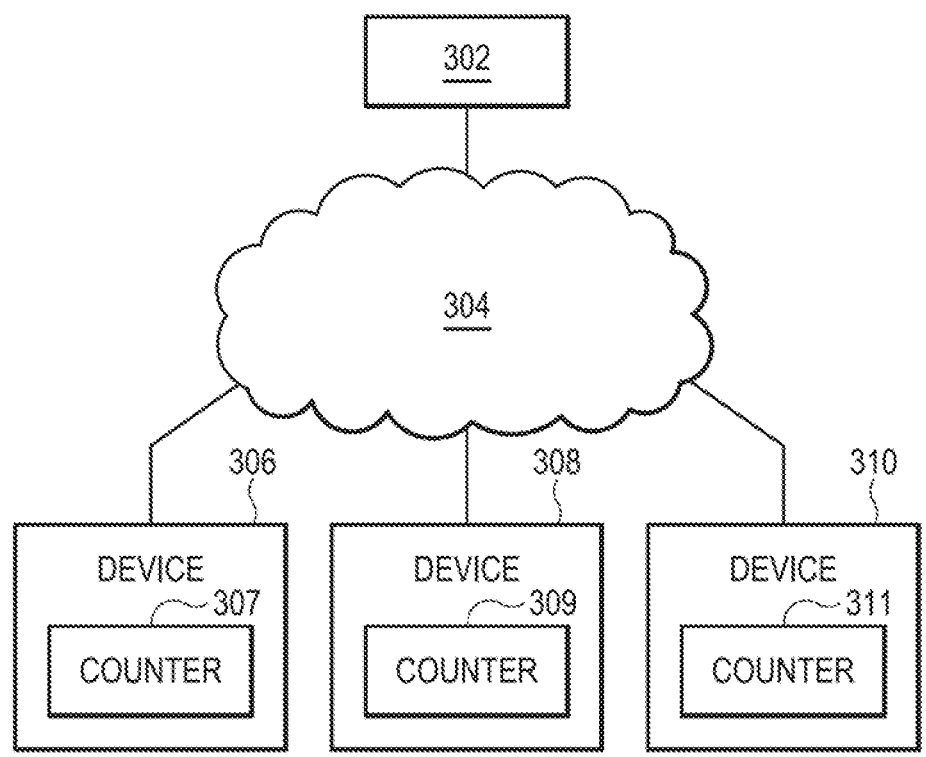
FIG. 3 is a further example system in accordance with aspects of the present disclosure.
Figure 4:
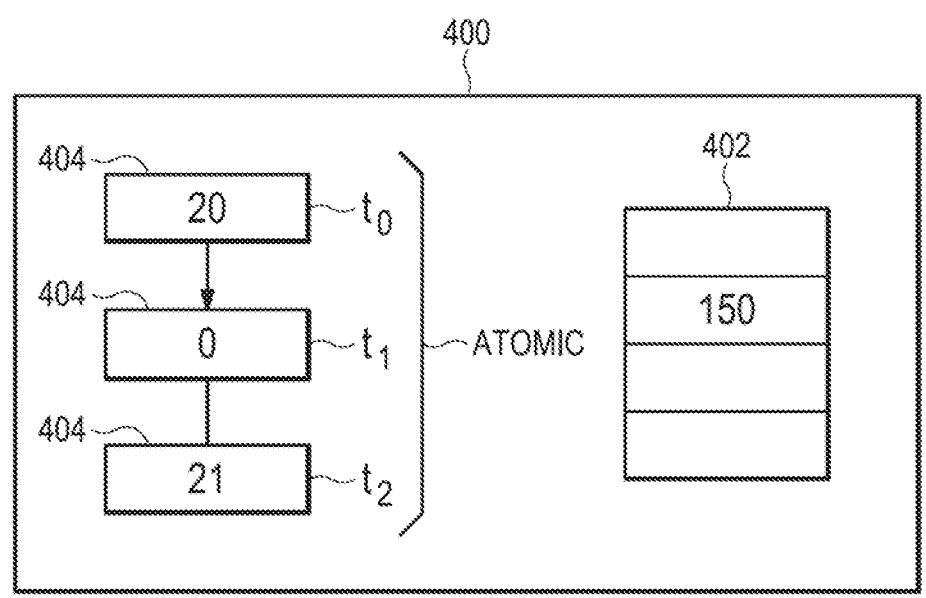
FIG. 4 is an example device in accordance with aspects of the present disclosure.

Examples of the system, method, and non-transitory computer-readable medium are shown in FIGS. 2-4. In particular, FIG. 2 illustrates a flow diagram of an example method 200 for managing license to use agreements. FIGS. 3-4 each show an example in accordance with the techniques disclosed herein. The actions shown in FIGS. 3-4 will be discussed below with regard to the flow diagram of FIG. 2.

As shown in block 202 of FIG. 2, it may be determined whether a maximum number of credits available for a given device is greater than or equal to the sum of credits consumed by the given device and the number of credits requested by the device. A packet of data generated by a remote license or usage manager may contain the maximum number of credits a given device is allowed to consume. Referring now to FIG. 3, remote usage manager 302 may act as a remote license manager. Thus, remote usage manager 302 may supervise a plurality of devices such that a usage of each device or a software product therein does not exceed a maximum number of credits in accordance with a license to use agreement. As noted above, the device may be a mobile device, such as a smart phone or a tablet PC. In another example, the device may be a printing device and the maximum number of credits may be associated with the maximum number of pages that a given printing device is allowed to print or the maximum amount of ink the printing device is allowed to employ. In a further example, the usage manager may be a server to encrypt and transmit the maximum number of credits available to a device using a right to use ("RTU") packet. The maximum number of credits may be authenticated using public key cryptography. In the event a license to use agreement expires or is cancelled, usage manager 302 may set the maximum number of credits of a given device to be less than or equal to the number of credits consumed by the device.

Remote usage manager 302 may govern the usage of devices 306, 308, and 310 and each device may comprise a counter 307, 309, and 311 respectively. Each counter may be indicative of the number of credits consumed by its associated device. Remote usage manager 302 may send the secure packet via network 304, which may be a LAN, WAN, the internet, etc., or which may he wired or wireless. As discussed above, each device may store the maximum number of credits in a non-volatile memory to ensure that it is stored despite a power outage or a shutdown. Such non-volatile memory may be for example, a phase change memory ("PCM") or spin-torque transfer RAM ("STT-RAM"). Each counter may be a read-write max counter that is impervious to decrease by an attacker. That is, an attacker is prevented from decreasing the number of credits consumed, which would allow a user to use the device or digital content beyond that which is allowed by the license to use agreement.

Referring back to FIG. 2, if the maximum number of credits available for a given device is greater than or equal to the sum of credits consumed and the number of credits requested by the given device, the counter may be increased, as shown in block 202. The increase may be initiated by a processor, such as processor 110, and carried out by a microcontroller, such as microcontroller 114. Referring now to FIG. 4, an illustrative device 400 is shown having non-volatile memory 402 and a counter 404. In this example, non-volatile memory 402 contains the maximum number of credits available, which is one hundred and fifty. Furthermore, FIG. 4 shows an atomic write of counter 404 from twenty to twenty one. In this example, the atomic write begins at time $t_0$; at time $t_1$, counter 404 may be set to zero and at time $t_2$ counter 404 may be set to twenty one. In this example, the increase is an atomic write such that if any of the steps from time $t_0$ thru time $t_1$ is interrupted or aborted, the entire sequence is rolled back and the counter remains unchanged. This "all or nothing" approach may prevent an attacker from intervening at, for example, time $t_1$ and setting the counter to a lower number.

Advantageously, the foregoing system, method, and non-transitory computer readable medium allow license to use agreements to be securely enforced. In this regard, an atomic write and an attacker resistant counter may prevent attackers from violating the license to use agreement by altering the counter. In turn, vendors of hardware or software products subject to a license to use agreement may be confident that the restrictions imposed by the license will not be violated by unscrupulous users.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
a printer usage manager to supervise a plurality of printing devices such that a usage of each printing device does not exceed a maximum number of credits in accordance with a license to use agreement;
at least one processor to determine whether the maximum number of credits available for a given printing device is greater than a sum of a number of credits consumed by the given printing device and a number of credits requested by the given printing device;
a counter to store a count value indicative of the number of credits consumed by the given printing device, wherein the counter is resistant to a decrease of the count value such that when the counter is in a process of increasing the count value from a previous number of consumed credits to a new number of consumed credits and the process is interrupted or aborted, the process is rolled back and the count value remains unchanged at the previous number of consumed credits; and
a microcontroller to increase the counter by the number of credits requested by the given printing device in response to a determination that the maximum number of credits available for the given printing device is greater than to the sum,
wherein, in response to the license to use the given printing device being expired or canceled, the printer usage manager is to set the maximum number of credits available for the given printing device to be less than or equal to the previous number of credits consumed by the given printing device.

2. The system of claim 1, wherein the maximum number of credits available is associated with a maximum number of pages the given printing device is allowed to print.

3. The system of claim 1, wherein the printer usage manager to transmit the maximum number of credits available to the at least one processor and the at least one processor to respond with a packet so as to acknowledge receipt and storage of the maximum number of credits.

4. The system of claim 1, wherein the maximum number of credits is stored in a non-volatile memory of the given printing device.

5. A non-transitory computer readable medium having instructions therein which, if executed, cause at least one processor of a device to:
   read a packet of data generated by a remote license manager, the packet containing a maximum number of credits the device is allowed to consume in accordance with a license to use agreement;
   determine whether the maximum number of credits is greater than a sum of a number of credits consumed by the device and a number of credits requested by the device;
   in response to a determination that the maximum number of credits allowed is greater than the sum, increase a count value of a counter indicative of the number of credits consumed by the device such that the increase is equal to the number of credits requested by the device, the counter being impervious to a decrease of the count value such that when the counter is in a process of increasing the count value from a previous number of consumed credits to a new number of consumed credits and the process is interrupted or aborted, the process is rolled back and the count value remains unchanged at the previous number of consumed credits; and
   in response to the license to use the device being expired or canceled, set the maximum number of credits the device is allowed to consume to be less than or equal to the number of credits previously consumed by the device.

6. The non-transitory computer readable medium of claim 5, wherein the device is a printing device and the maximum number of credits is associated with a maximum number of pages the printing device is allowed to print in accordance with the license to use agreement.

7. The non-transitory computer readable medium of claim 5, wherein the instructions stored therein, if executed, further instruct at least one processor to transmit a packet to the remote license manager so as to acknowledge receipt and storage of the maximum number of credits.

8. The non-transitory computer readable medium of claim 5, wherein the maximum number of credits is stored in a non-volatile memory of the device.

9. A method comprising
   storing, using at least one processor, a maximum number of credits a device is allowed to consume in accordance with a license to use agreement, the maximum number of credits being generated by a remote license manager;
   reading, using the at least one processor, a request to consume a number of credits;
   determining, using the at least one processor, whether the maximum number of credits is greater than a sum of a number of credits consumed by the device and the number of requested credits;
   in response to a determination that the maximum number of credits is greater than the sum, initiating, using the at least one processor, an increase of a count value of a counter by the number of credits requested by the device, the counter being resistant to a decrease of the count value such that when the counter is in a process of increasing the count value from a previous number of consumed credits to a new number of consumed credits and the process is interrupted or aborted, the process is rolled back and the count value remains unchanged at the previous number of consumed credits; and
   in response to the license to use the device being expired or canceled, altering, using the at least one processor, the maximum number of credits the device is allowed to consume to be less than or equal to the number of credits previously consumed by the device.

10. The method of claim 9, wherein the device is a printing device and the maximum number of credits is associated with a maximum number of pages the printing device is allowed to print in accordance with the license to use agreement.

11. The method of claim 9, further comprising transmitting, using the at least one processor, a packet to the remote license manager so as to acknowledge receipt and storage of the maximum number of credits the device is allowed to consume.

12. The method of claim 9, wherein the maximum number of credits is stored in a non-volatile memory of the device.

\* \* \* \* \*